(12) United States Patent
Nemati et al.

(10) Patent No.: US 12,493,518 B2
(45) Date of Patent: Dec. 9, 2025

(54) ERROR CORRECTION USING ON-DIE PARITY BIT STORAGE AND TRANSITIONAL SIGNALS

(71) Applicant: Microsoft Technology Licensing, LLC, Redmond, WA (US)

(72) Inventors: Majid Anaraki Nemati, San Diego, CA (US); Terry M. Grunzke, Boise, ID (US); Brett Dodds, Boise, ID (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/491,308

(22) Filed: Oct. 20, 2023

(65) Prior Publication Data
US 2025/0130895 A1    Apr. 24, 2025

(51) Int. Cl.
*G06F 11/10* (2006.01)
(52) U.S. Cl.
CPC ...... *G06F 11/1068* (2013.01); *G06F 11/1004* (2013.01); *G06F 11/1048* (2013.01)
(58) Field of Classification Search
CPC ............. G06F 11/1068; G06F 11/1048; G06F 11/1004
See application file for complete search history.

(56) References Cited

U.S. PATENT DOCUMENTS

| | | | | |
|---|---|---|---|---|
| 2008/0133448 A1* | 6/2008 | Molaro | ............... | G06F 11/1008 714/763 |
| 2014/0157078 A1* | 6/2014 | Danilak | ............. | G06F 11/1048 714/773 |
| 2015/0301964 A1* | 10/2015 | Brinicombe | ............ | G06F 3/067 710/308 |
| 2016/0239666 A1* | 8/2016 | Obukhov | ................ | H04L 9/065 |
| 2016/0261375 A1* | 9/2016 | Roethig | .................. | H04L 7/041 |

FOREIGN PATENT DOCUMENTS

| | | | |
|---|---|---|---|
| EP | 2372550 A1 | 10/2011 | |
| WO | WO-2016140765 A2 * | 9/2016 | ........... H04L 1/0041 |

OTHER PUBLICATIONS

International Search Report and Written Opinion received for PCT Application No. PCT/US2024/049688, Dec. 17, 2024, 12 pages.

* cited by examiner

*Primary Examiner* — Mark D Featherstone
(74) *Attorney, Agent, or Firm* — Holzer Patel Drennan

(57) ABSTRACT

The described technology provides a multi-level error correction method, including encoding data received from a double data rate (DDR) memory by performing primary coding to generate transitional symbols, wherein the primary coding comprising at least one of cyclical redundancy check (CRC) encoding and single error correction double error detection (SECDED) encoding, performing a secondary coding on the transitional symbols to generate inner codes, the inner codes comprising code 1 parities generated from the transitional symbols and code 2 parities generated from the transitional symbols and metadata stored on the DDR memory, wherein the secondary coding comprising Reed Solomon (RS) encoding, and saving the inner codes on parity bit storage locations on a die of the DDR memory.

20 Claims, 15 Drawing Sheets

ERROR CORRECTION USING ON-DIE PARITY BIT STORAGE AND TRANSITIONAL SIGNALS

BACKGROUND

In many computer systems, error checking and correction (ECC) is used to detect and correct errors in data stored in a memory of the computer system. To protect data using error checking and correction, an algorithm is applied to the data before the data is stored in the memory, with the algorithm generating a corresponding error correcting code. Depending upon the type of error checking and correction being utilized, the code may allow the detection of one or more erroneous bits in the data and may also allow for the correction of one or more such erroneous bits. For any dynamic random-access memory (DRAM) devices, simple protections like adding a parity bit may be used to protect against potential failures. Using too many parity bits for protecting data is wasting memory. On the other hand, when using too few parity bits may not allow error detection or correction. For example, if Hamming code is used for parity bit correction, the amount of parity data added to Hamming code is given by the formula $2^p \geq d+p+1$, where p is the number of parity bits and d is the number of data bits. Thus, higher the number of parity bits p, the higher the number of data bits d it covers.

SUMMARY

The described technology provides a multi-level error correction method, including encoding data received from a double data rate (DDR) memory by performing primary coding to generate transitional symbols, wherein the primary coding comprising at least one of cyclical redundancy check (CRC) encoding and single error correction double error detection (SECDED) encoding, performing a secondary coding on the transitional symbols to generate inner codes, the inner codes comprising code 1 parities generated from the transitional symbols and code 2 parities generated from the transitional symbols and metadata stored on the DDR memory, wherein the secondary coding comprising Reed Solomon (RS) encoding, and saving the inner codes on parity bit storage locations on a die of the DDR memory.

The above presents a simplified summary of the innovation in order to provide a basic understanding of some implementations described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Other implementations are also described and recited herein.

BRIEF DESCRIPTIONS OF THE DRAWINGS

Examples are illustrated in referenced figures of the drawings. It is intended that the examples and figures disclosed herein are to be considered illustrative rather than restrictive.

DETAILED DESCRIPTIONS

Technology disclosed herein relates to using error correction code (ECC) storage capacities provided at memory (DDR) level by a host. Memory vendors provide on-die parity bits that can be used to correct memory block errors. Currently, hosts (CPUs) do not have access to the on-die parity bit storage locations. In the technology disclosed herein, the ECC is still stored in dual-inline memory module (DIMM) of RAM, however it is used by a host memory controller. The technology disclosed herein generates parity bits by performing multi-level ECC on the data received form the memory and stores the parity bits at the on-die parity bit storage location.

The technology disclosed herein applies two-level error coding of the data to generate parity bits that can be stored back on the memory such that the erasure decoding algorithm used by the host knows the location (which die) of the error on the memory. Having the information about the location of the error allows the erasure decoding algorithm of the host to recover the data more efficiently. Specifically, the multi-layer ECC system disclosed herein uses erasure decoding to do the error correction coding with as few bits as is reasonable but also providing a reasonable amount of single bit error correction.

Specific implementations disclosed herein illustrates performing ECC on data from each die in the memory to generate transitional symbols for each of a first series of transitional symbols and a second series of transitional symbols. Transitional symbols or transitional data, are transitional in that they are not stored permanently. For example, such transitional symbols may be calculated generated from the data on the DRAM and used to generate inner codes as disclosed herein. Once the inner codes are generated, the transitional symbols are not stored anywhere, neither in the DRAM nor by the host. Subsequently, RS encoding of the first series of transitional symbols generates code 1 parities and RS encoding of the second series of transitional symbols generates code 2 parities, wherein the code 2 parities are 16-bits of parity, four 4-bits P12, P22, P32, and P42, generated by applying Reed-Solomon (RS) algorithm on 11 4-bit second series of transitional symbols. The code 1 parities and the code 2 parities together allows the host to identify the die on which a fault has occurred. Providing the host with the identification of the die with the fault allows the host to use erasure decoding to recover the data. In one implementation, the code 1 parities and the code2 parities are stored on the on-die parity storage locations, thus making the on-die bits being available to store the parity bits.

Figure 1:
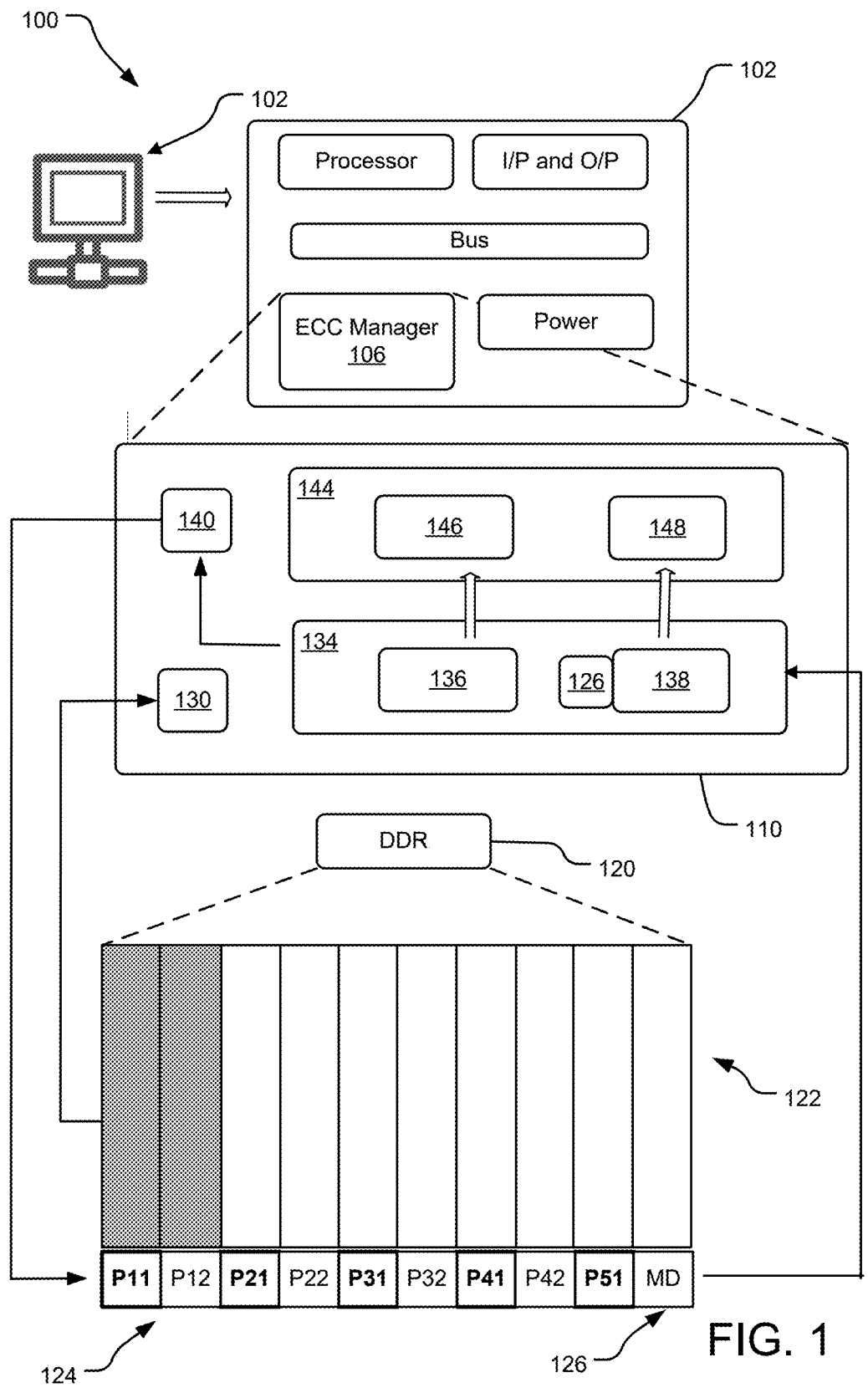
FIG. 1 illustrates an example computing system including an ECC management system using on-die parity bit storage.

FIG. 1 illustrates a computing system 100 including an ECC management system using on-die parity bit storage. The computing system 100 may include a computing device 102 such as a server, a desktop, a laptop, a mobile device, etc. One or more of the modules on the computing device 102 may include a processor, input and output modules, a communication bus, a power module, etc. Further details of the one or more components of the computing system 102 are further disclosed in detail in FIG. 15 below. In the illustrated implementation, the computing system 102 also includes an error correction code (ECC) manager 106. Specifically, the ECC manager 106 may be configured to use on-die parity bit storage capacity of various DRAM storage modules, and it does not have to store them on the ECC manager 106. The ECC manager 106 may regenerate transitional symbols from the data stored on the DRAM storage modules for decoding purposes and use it for regenerating the inner codes.

The illustrated implementation shows the ECC manager 106 in communication with a DRAM 120 that may be, for example a double data rate (DDR) DRAM. Examples of DDR DRAM 120 may include any synchronous DDR, such as a DDR5 DRAM, a DDR6 DRAM, etc., that provides storage capacity for parity bits on the die of the DDR. Specifically, the DDR 120 may include a number of data blocks 122 or dies 122. In the illustrated implementation, the DDR 120 has ten (10) dies 122 and each die is configured to store 64 bits of data and 4 bits of parity data and/or metadata. The 64 bits of data per die may be used as cacheline data by the processor of the computing device 102. The DDR 120 also has nine (9) 4-bit parity storage space 124.

The ECC manager 120 includes a transitional symbols generator 130 and an inner code encoder 140. The transitional symbols generator 130 may perform primary coding on the 64 bits of data from the dies 122 to generate transitional symbols 134. The primary error correction coding may include use of cyclical redundancy check-8 (CRC-8) code or a single-error correction and double-error detection (SECDED) Hamming code. Specifically, the transitional symbols 130 may include a first series of transitional symbols 136 and second series of transitional symbols 138. In one implementation, the transitional symbols generator 130 may use a cyclical redundancy check-8 (CRC-8) code or a single-error correction and double-error detection (SECDED) Hamming code to generate the transitional symbols 134. However, in other implementations, alternative code may be used to generate the transitional symbols 134. Each symbol of the first series of transitional symbols 136 may be a four-bit symbol. Similarly, each symbol of the second series of transitional symbols 138 may also be a four-bit symbol.

The first series of transitional symbols 136 may include 4 bits (Si1) where i indicates the die number, which in this case maybe 1-10, per each die of the DDR 120. Similarly, the second series of transitional symbols 138 may also include 4 bits (Si2) where i indicates the die number, which in this case maybe 1-10, per each die of the DDR 120. Thus, for each die of the DDR 120, 8 bits of parity bits are generated from the 64 bits of the data on the die. For example, the die 1 has 4 bits S110 in the first series of transitional symbols 136, and four bits S12 in the second series of transitional symbols 138, the die 2 has 4 bits S21 in the first series of transitional symbols 136, and four bits S22 in the second series of transitional symbols 138, etc.

Subsequently, the inner code decoder 140 may perform a secondary ECC on the transitional symbols 134 to generate inner codes 144. In one implementation, the inner codes 144 may include code 1 parities 146 generated from the first series of transitional symbols 136 and code 2 parities 148 generated from the second series of transitional symbols 138 and metadata 126 stored on the memory. Specifically, the code 1 parities 146 include five 4-bit parities P11, P21, P31, P41, and P51 generated from ten 4-bit transitional symbols. In one implementation, the inner decoder 140 may use a Reed Solomon (RS) decoder to generate the code 1 parities 146 and the code 2 parities 148.

In one implementation, the code 2 parities 148 are generated by an RS (15,11) encoder that takes as input 11 symbols including ten of the 4-bit second series of transitional symbols 138 and the 4-bit metadata 126 and outputs 15 output symbols including four (4) code 2 parities, each of 4-bits. Thus, the code 2 parities 148 have 16 bits.

Similarly, the code 1 parities 146 are generated by an RS (15,10) encoder that takes as input 10 symbols including ten of the 4-bit first series of transitional symbols 138 and outputs five (5) code 1 parities, each of 4-bits. Thus, the code 1 parities 146 have 20 bits. As code 1 parities 146 is generated from 10 transitional symbols and it has five (5) 4-bit codes, it is a stronger inner code parity compared to the code 2 parities 148, which takes in 10 transitional symbols and the metadata to generate four (4) 4-bit codes.

Subsequently, the five (5) 4-bit inner code 1 parities and the four (4) 4-bit inner code 2 parities (thus, total of nine (9) 4-bit inner code parities 144) are stored in the nine (9) 4-bit parity storage space 124 on the DDR 120. In one implementation the five (5) 4-bit inner code 1 parities (P11, P21, P31, P41, P51) and the four (4) 4-bit inner code 2 parities (P12, P22, P32, P42) are stored alternatively in parity storage space 124. Thus, the parity storage space 124 may store inner codes 144 P11, P12, P21, P22, P31, P32, P41, P42, and P51.

In the illustrated implementations, the transitional symbols 134 are not used directly to correct errors that may have happened on the data stored in the DDR 120. The host computing system 102 may reconstruct them when it is reading the data from the DDR 120. Given that the code 1 parities 146 are stronger, code 1 parities may be decoded first and then code 2 parities 148 may be erasure decoded.

As the illustrated implementations use the metadata bits 126 in generating the code-2 parity bits, the host computing system 102 does not have to store the metadata and it is still capable of recovering data if an entire die is corrupted, also known as chip-kill case of data corruption.

Figure 2:
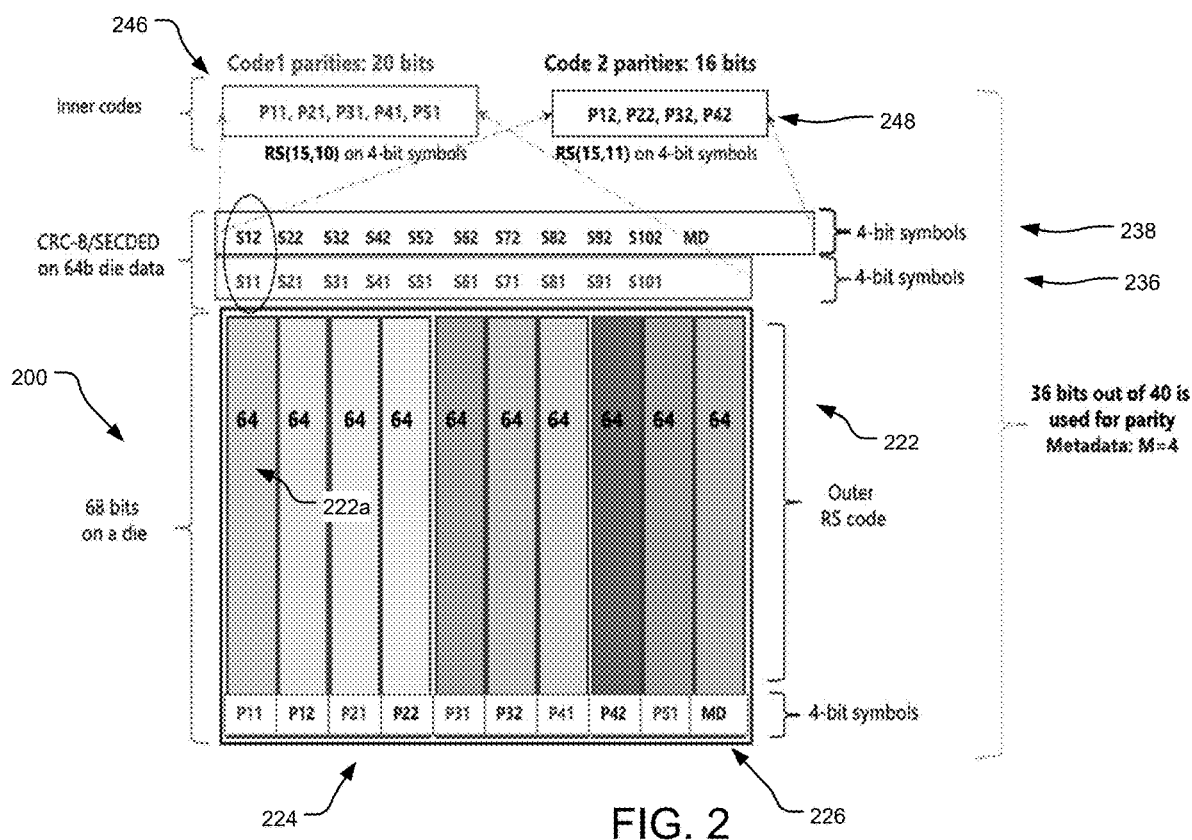
FIG. 2 illustrates example details regarding the transitional symbols and the parity bits generated by the ECC management system disclosed herein.

FIG. 2 illustrates details regarding the transitional symbols and the parity bits generated by the ECC management system disclosed herein. Specifically, FIG. 2 illustrates an implementation of a DDR 200 which has 10 dies 222, each die having 64 data bits and four parity bits 224 and/or 4 metadata bits 226. Specifically, the first 9 dies have 4 parity bits, and the tenth die has four bits for metadata.

An ECC manager implemented on a computing device may generate a first series of transitional symbols 236 and second series of transitional symbols 238 based on the data stored on the 64 bits of the dies 222. The first series of transitional symbols 238 may include S11, S21, . . . . S101, each having four bits. On the other hand, the second series of transitional symbols 236 may include S12, S22, . . . . S102, each having four bits, and the four metadata bits. Each of the first series of transitional symbols 236 and second series of transitional symbols 238 may be generated using a CRC-8 or a SECDED coder.

Furthermore, the ECC manager also generates code 1 parity bits 246 from the first series of transitional symbols 236 and code 2 parity bits 248 from the second series of transitional symbols 238 and the metadata bits. As shown herein, the code 1 parity bits 246 include five 4-bit codes P11, P21, P31, P41, and P51. The code 2 parity bits 248 include four 4-bit codes P12, P22, P32, and P42. In the implementation disclosed herein, the code 1 parity bits P11, P21, P31, P41, and P51 and code 2 parity bits P12, P22, P32, and P42 are stored on the parity storage locations 224 on the DDR 200. Thus, 36 out of the 40 parity bit storage locations are used to store the parity bits generated by the ECC manager and 4 bits are used for storing the metadata.

During the operation of reading the data from a given dies 222a of the DDR 200, the data from that die 222a is used to generate the transitional symbols S11 and S12 using CRC-8. If there are no errors on the dies 222a, the transitional symbols S11 and S12 will be the same as at the time of encoding of the inner codes. If there are no errors on any of the dies 222, all transitional symbols 236 and 238 will be same as during encoding the inner codes and therefore, the code 1 parities 246 and the code 2 parities 248 will also be the same. However, if there was an error on the die 222a, the S11 and S12 will be different than their values generating during coding of the inner codes. In this case, because the code 1 parities 246 can detect up to three errors on the first series of transitional symbols 236, it can detect that S11 has error indicating error on die 222a. The information about the location of error, that is, which die has an error may be passed on to ECC manager used by a host. In this case, the host may use erasure decoding to correct the error on die 222a.

When the host knows the location of the error, that is the die on which error may have occurred, it can correct that error and recover the data from that die more efficiently. Thus, the technology disclosed herein provides a technical benefit to the host by making its erasure decoding operations more efficient. For example, when the ECC decoder at the host knows the location of the error it can correct errors on up to two of the ten dies 222. As a result, the chance of mis-correction by the host ECC decoder is also eliminated as long as only two of the dies 222 contains errors, except when each of the two dies having errors in each of its data bits and parity bits.

Figure 3:
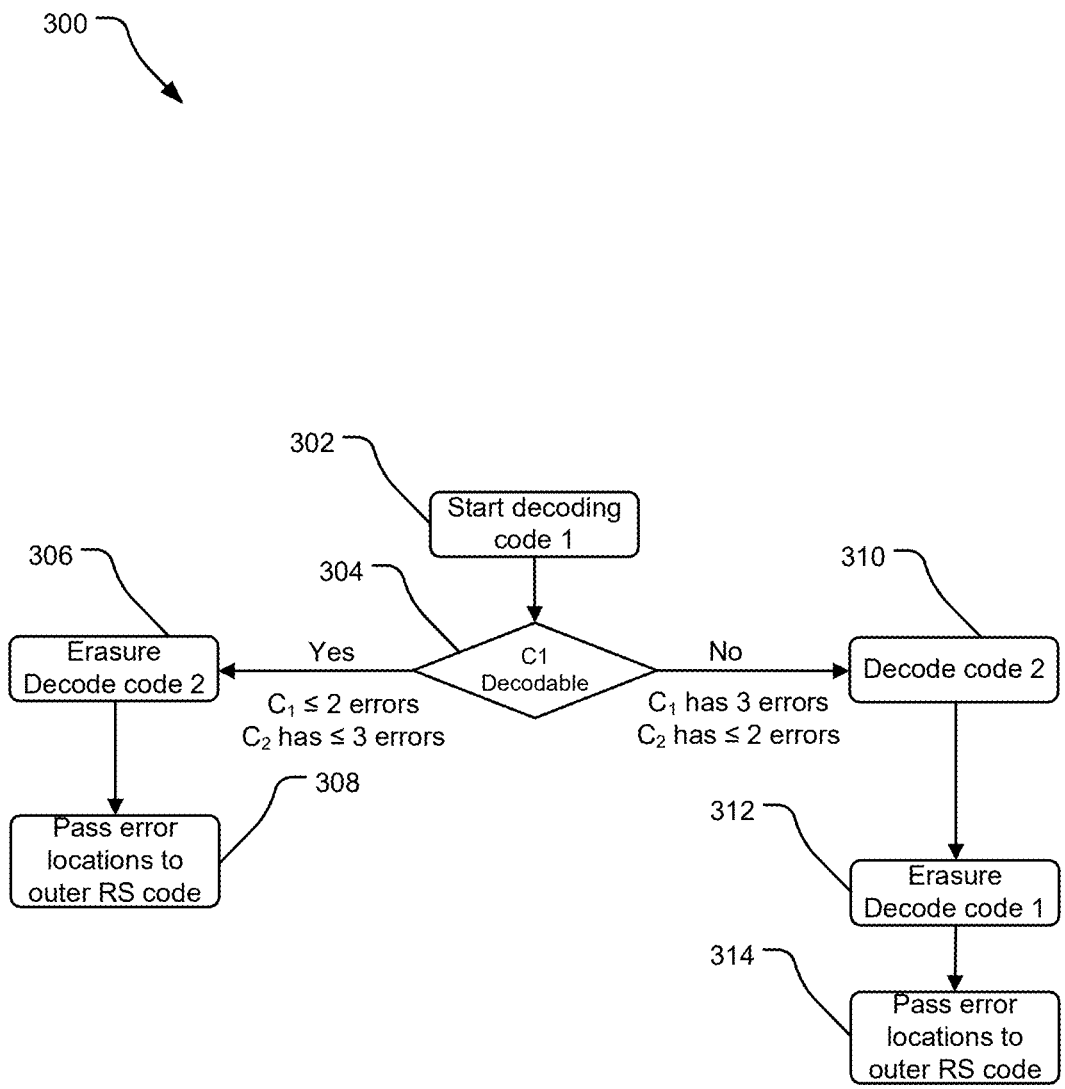
FIG. 3 illustrates example operations for decoding the data from the DDR using the transitional symbols and the inner codes.

FIG. 3 illustrates example operations 300 for decoding the data from the DDR using the transitional symbols and the inner codes. Specifically, operation 302 starts with decoding inner code 1, such as the code 1 parities 246 disclosed in FIG. 2. The disclosed implementation starts with decoding the inner code 1 because it is stronger that the inner code 2 and has higher correction capabilities than the inner code 2, such as the code 2 parities 248. An operation 304 determines if the code 1 is decodable. If so, the information generated at the decoding of the inner code 1 parities is passed onto erasure decoding of the inner code 2 parities and an operation 306 erasure decodes code 2 parities. Subsequently, an operation 308 passes on the error locations to a host decoder such as an RS decoder, also known as the outer RS coder.

If the operation 304 determines that code 1 is not decodable, an operation 310 decodes the code 2 parities. Specifically, when there are three errors in first series of transitional symbols 236 the second series of transitional symbols 238 has at most two errors (sch as a die failure and a single error on a different die). Therefore, the second series of transitional symbols 238 may be decoded directly from the code 2 parities. Subsequently, the output from the decoding operation at 310 is passed on to erasure decoding and used at operation 312 to erasure decode the code 1 parities. Subsequently, the error location information generated by the erasure decoding operation 312 is communicated to a host decoder such as an RS decoder at operation 314.

Figure 4:
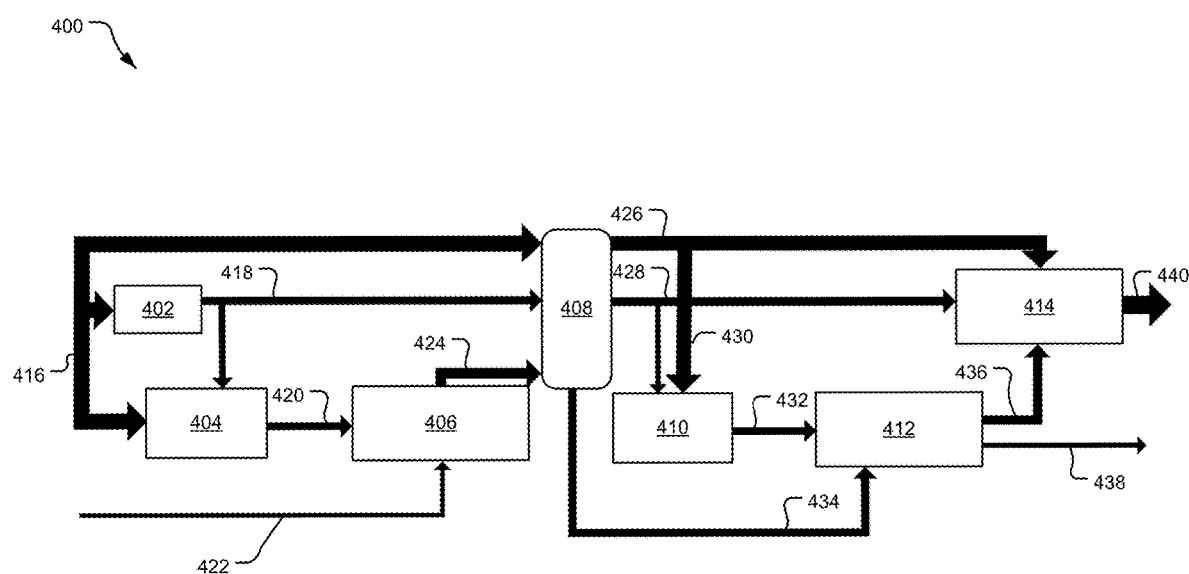
FIG. 4 illustrates an example block diagram illustrating flow of data and parity bits between data storage dies and an ECC management system using on-die parity bit storage.

FIG. 4 illustrates an example block diagram 400 illustrating flow of data and parity bits between data storage dies and an ECC management system using on-die parity bit storage. Specifically, the block diagram 400 illustrates 64 bytes of cacheline data 416 being input to an outer RS encoder 402 to generate 16 bytes of parity bits 418 that are input to a transitional symbol generator 404. The transitional symbol generator 404 generates transitional symbols 420 for each die. In one implementation, the transitional symbol generator 404 may use CRC encoding to generate the transitional symbols 420. The transitional symbols 420 and metadata 422 are input into an inner code encoder 406 that generates inner code parities 424 and the inner code parities 424 and the metadata 422 are written back to the on-die ECC bits 408 of the DDR.

During the decoding operation, the 64-byte cacheline data 426 from the DDR are read into an outer RS encoder 414. The parity bits 428 from two dies on the DDR are also input to a transitional symbol regenerator 410 together with the 64-byte cacheline data 426 to generate transitional symbols 432. The transitional symbols 432 together with the inner codes+ metadata 434 are input to an inner code decoder 412 that generates erasure information 436. Such erasure information 436 may provide the location of the die on which an error may have occurred. For example, the erasure information 436 may provide that dies x and/or y on the DDR has erroneous data. The outer RS encoder 414 uses the erasure information 436, the 64-byte cacheline data 426, and the parity bits 428 to regenerate the corrected 64 byte of user data. The inner code decoder 412 also decodes the metadata 436 that is communicated to a host.

Figure 5:
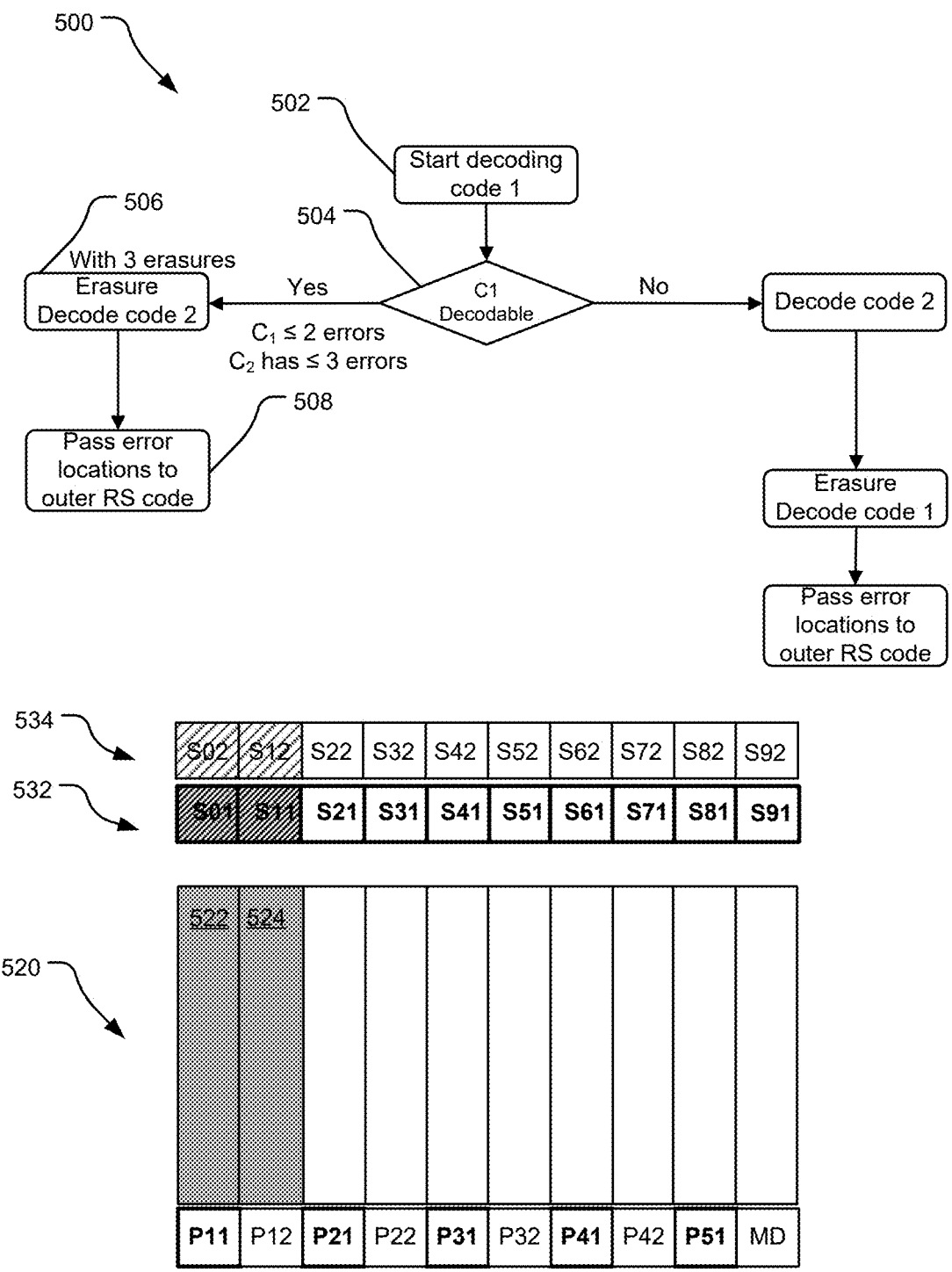
FIG. 5 illustrates an example case wherein a DDR has an error on a first die and an error on a second die.

FIG. 5 illustrates a case 500 wherein a DDR 520 has an error on a first die 522 and an error on a second die 524. Specifically, in this example, each of the dies 522 and 524 has errors on the main data portion of the dies and there are no errors on the parity section P11 and P12 of the dies. In this case, an operation 502 first starts decoding code 1 parities (C1). An operation 504 determines if C1 is decodable. In this case, given the two errors on the data sections of the dies 522 and 524, there will be two errors on the first series of transitional symbols 532, namely S01 and S11. Similarly, there are two errors on the second series of transitional symbols 534, namely S02 and S12.

Code 1 is able to correct up to two errors, therefore, from operation 504, the control transfers to operation 506 which erasure decodes code 2 (C2) as it has less than three errors. As a result, operation 506 is able to decode code 2 and an operation 508 passes on the erasure information, in this case the location of the errors on data sections of dies 522 and 524 to the outer decoder.

Figure 6:
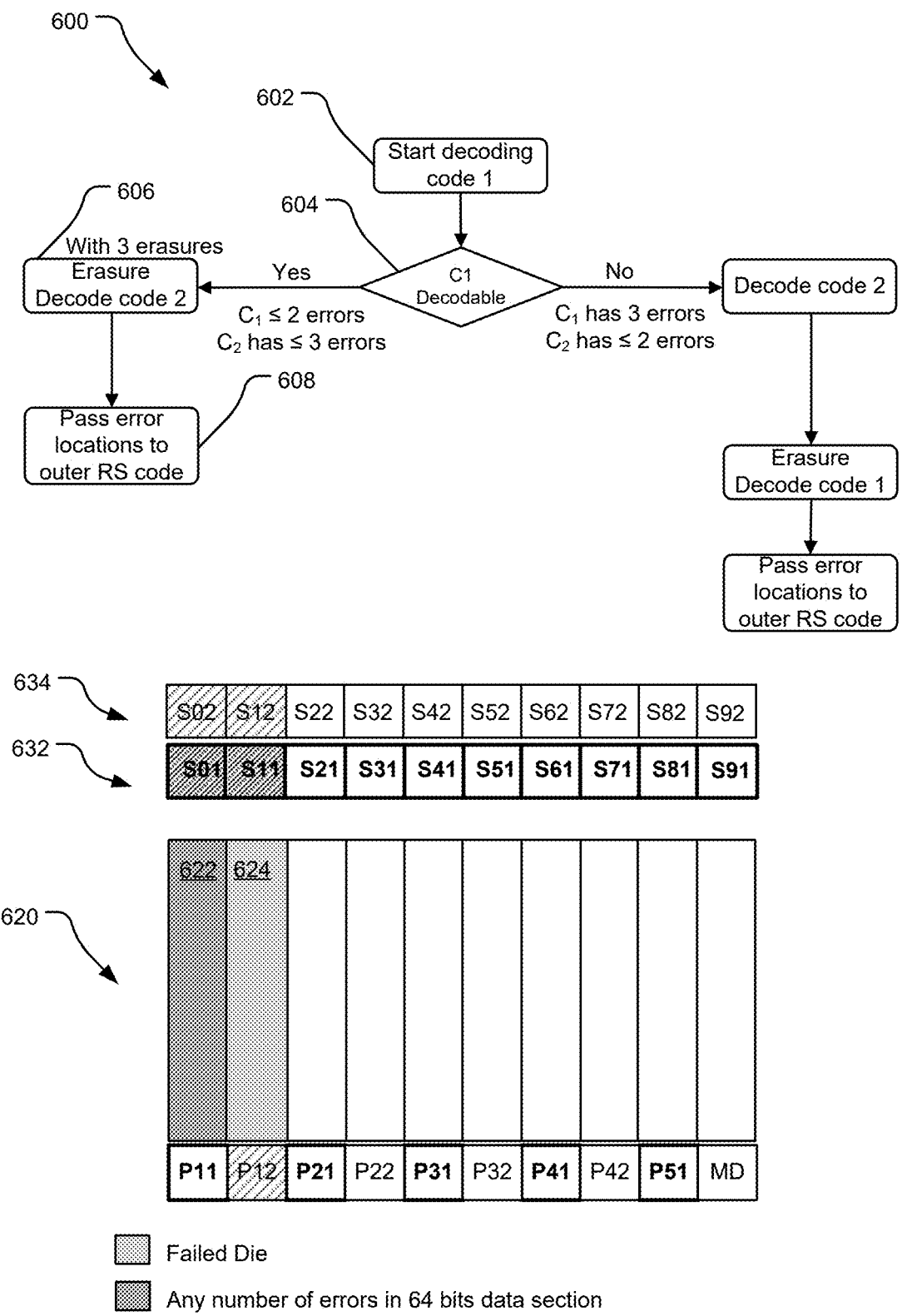
FIG. 6 illustrates an example case wherein a DDR has an error on a data section of a first die, an error on the data portion of a second die, and also an error on a parity bits on the second die.

FIG. 6 illustrates a case 600 wherein a DDR 620 has an error on a data section of a first die 622, an error on the data portion of a second die 624, and also an error on a parity bits P12 on the second die 624. In this case, the first series of transitional symbols 632 has two errors in symbols S01 and S11, which can be corrected. However, the second series of transitional symbols 634 cannot be corrected as it has three errors. However, because errors in the first series of transitional symbols 632 can be corrected, it can provide the location of the errors.

In this case, an operation 602 first starts decoding code 1 parities (C1). An operation 604 determines if C1 is decodable. Code 1 is able to correct up to two errors, therefore, from operation 604, the control transfers to operation 606 which erasure decodes code 2 (C2) as it has less than three errors and their location is known (namely S02, S12, and P12). As a result, operation 606 is able to decode code 2 and an operation 608 passes on the erasure information, in this case the location of the errors on data sections of dies 622 and 624 and on the parity section of the die 624 to the outer decoder.

Figure 7:
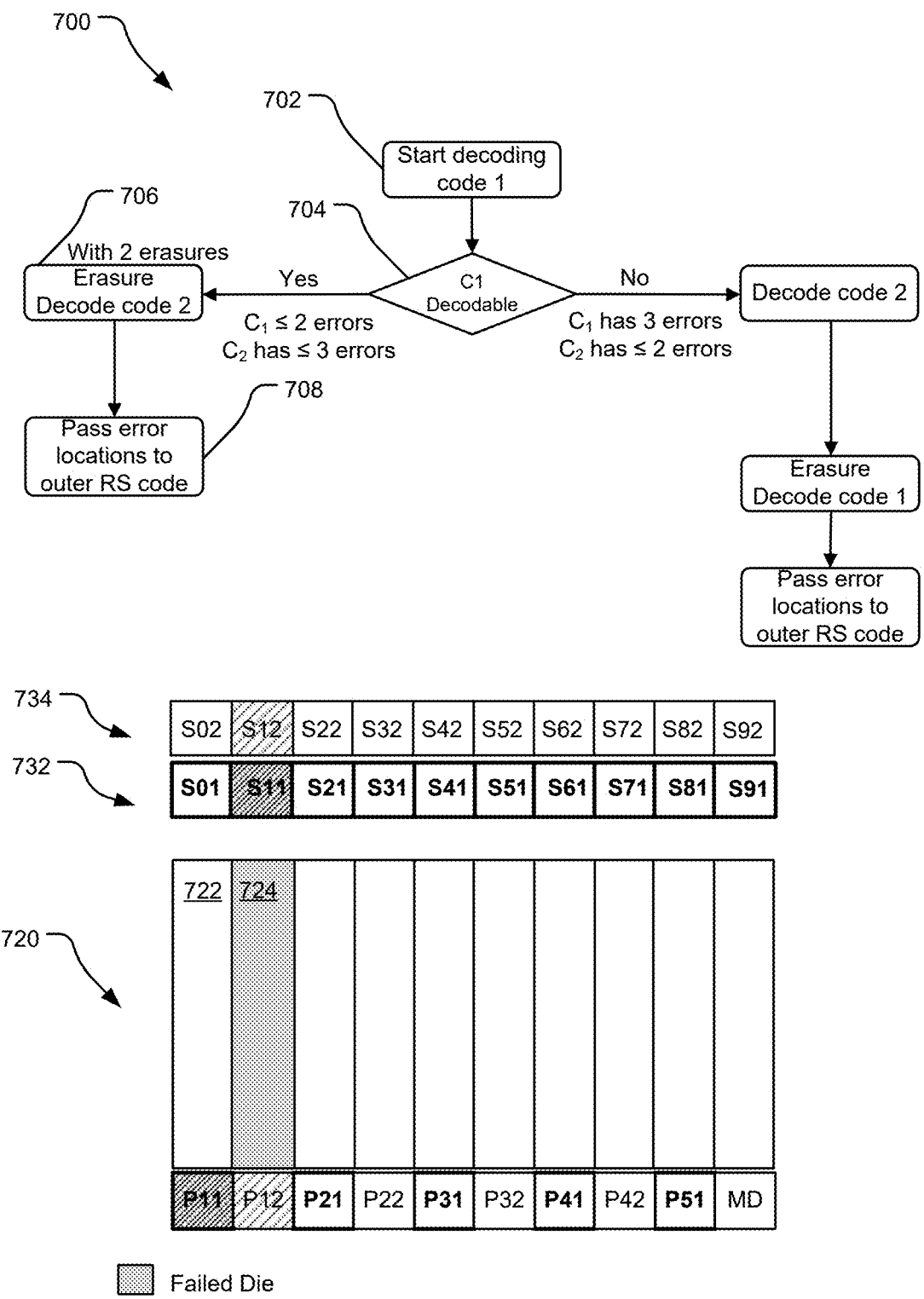
FIG. 7 illustrates an example case wherein a DDR has an error on a parity section of a first die, an error on the data portion of a second die, and also an error on a parity section on the second die.

FIG. 7 illustrates a case 700 wherein a DDR 720 has an error on a parity section P11 of a first die 722, an error on the data portion of a second die 724, and also an error on a parity section P12 on the second die 724. In this case, the first series of transitional symbols 732 has an error in S11 and the second series of transitional symbols 734 has an error in S12.

In this case an operation 702 first starts decoding code 1 parities (C1). An operation 704 determines if C1 is decodable. Code 1 is able to correct up to two errors and in this case, there is only one error in S11 in first series of transitional symbols 732 and one error in the parity P11, therefore 704 is able to correct Code 1. From operation 704, the control transfers to operation 706. The operation 706 is able to erasure decode code 2 as it has two only errors, namely in S11 and P12. As a result, operation 706 is able to decode code 2 and an operation 708 passes on the erasure information, in this case the location of the errors to the outer decoder.

Figure 8:
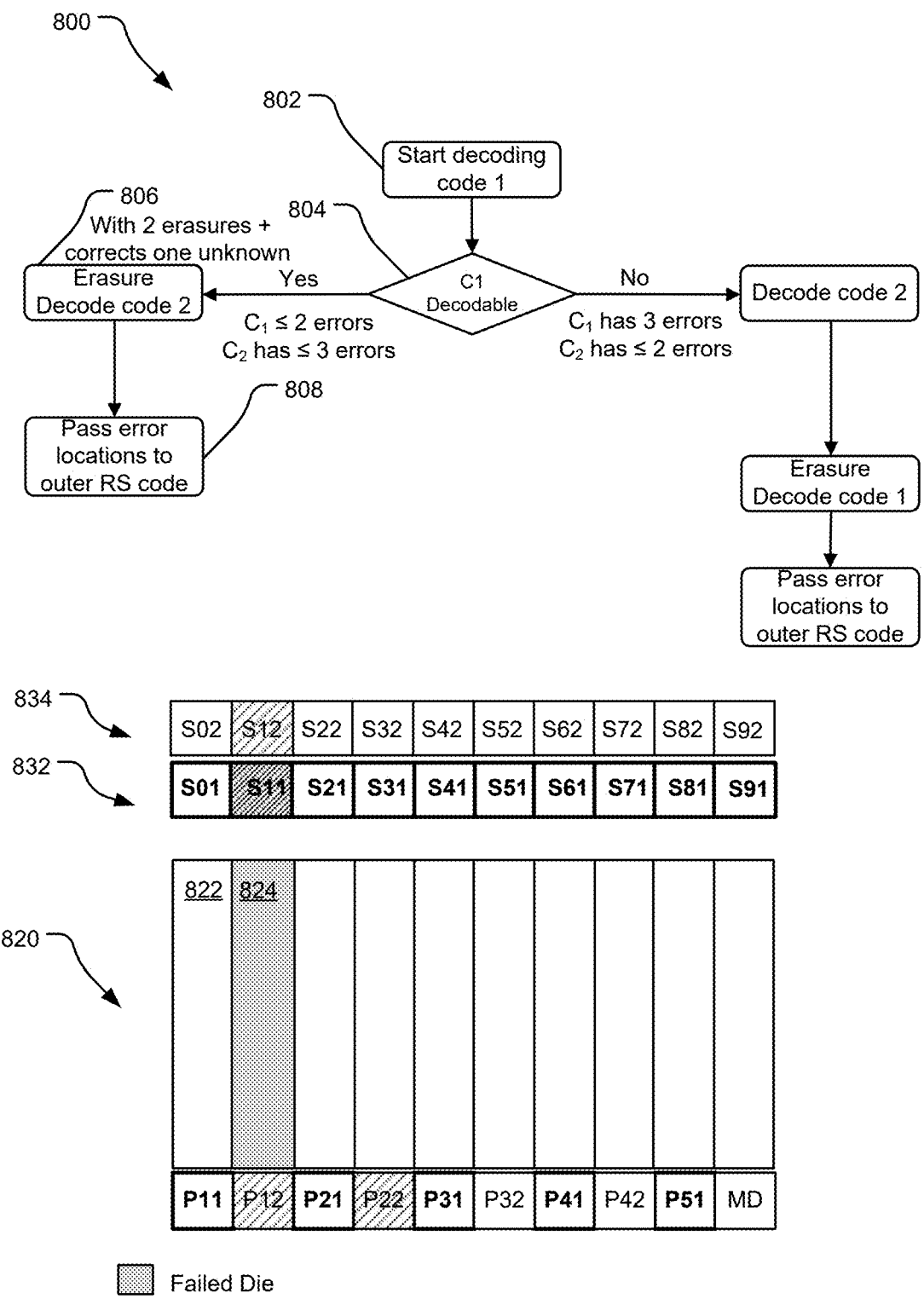
FIG. 8 illustrates a case wherein a DDR has an error on a parity section of a first die, an error on the data portion of a second die, and also an error on a parity section on the second die.

FIG. 8 illustrates a case 800 wherein a DDR 820 has an error on a parity section P11 of a first die 822, an error on the data portion of a second die 824, and also an error on a parity section P12 on the second die 824. In this case, the first series of transitional symbols 832 has an error in S11 and the second series of transitional symbols 834 has an error in S12.

An operation 802 first starts decoding code 1 parities (C1). An operation 804 determines if C1 is decodable. Code 1 is able to correct up to two errors and in this case, there is one error in S11 in first series of transitional symbols 832 and one error in the parity P11, therefore 804 is able to correct Code 1. From operation 804, the control transfers to operation 806. The operation 806 is able to erasure decode code 2 as it has two only errors, namely in S12 and P12. As a result, operation 806 is able to decode code 2 and an operation 808 passes on the erasure information, in this case the location of the errors to the outer decoder. Specifically, only the data portion of the die 824 is communicated as the erasure information to the outer decoder.

Figure 9:
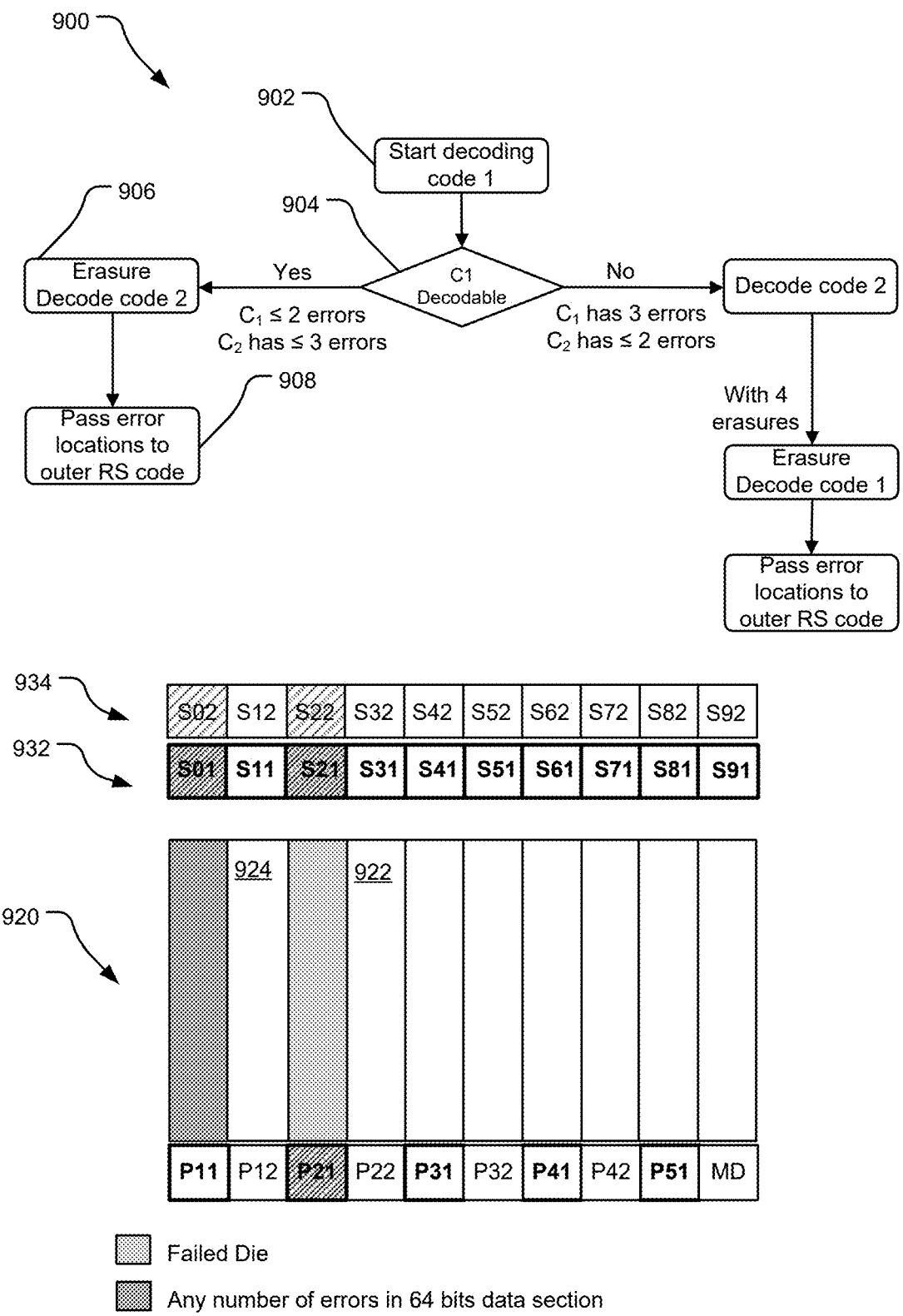
FIG. 9 illustrates an example case wherein a DDR has an error on a parity section of a die, an error on the data portion of a die, and also an error on a parity section on the die.

FIG. 9 illustrates a case 900 wherein a DDR 920 has an error on a parity section P22 of a die 922, an error on the data portion of a die 924, and also an error on a parity section P12 on the die 924. In this case, there is only one error in the code 1 parity, namely S11 and three errors in code 2 parity, namely S12, P12 and P22.

An operation 902 first starts decoding code 1 parities (C1). An operation 904 determines if C1 is decodable. Code 1 is able to correct up to two errors and in this case, there is one error in S11 in first series of transitional symbols 832 therefore 904 is able to correct Code 1. From operation 904, the control transfers to operation 906. The operation 906 is able to erasure decode code 2 as it has three errors, namely in S12, P12 and P22, but the location of the two errors is known. As a result, operation 906 is able to decode code 2 and an operation 808 passes on the erasure information, in this case the location of the errors to the outer decoder.

Figure 10:
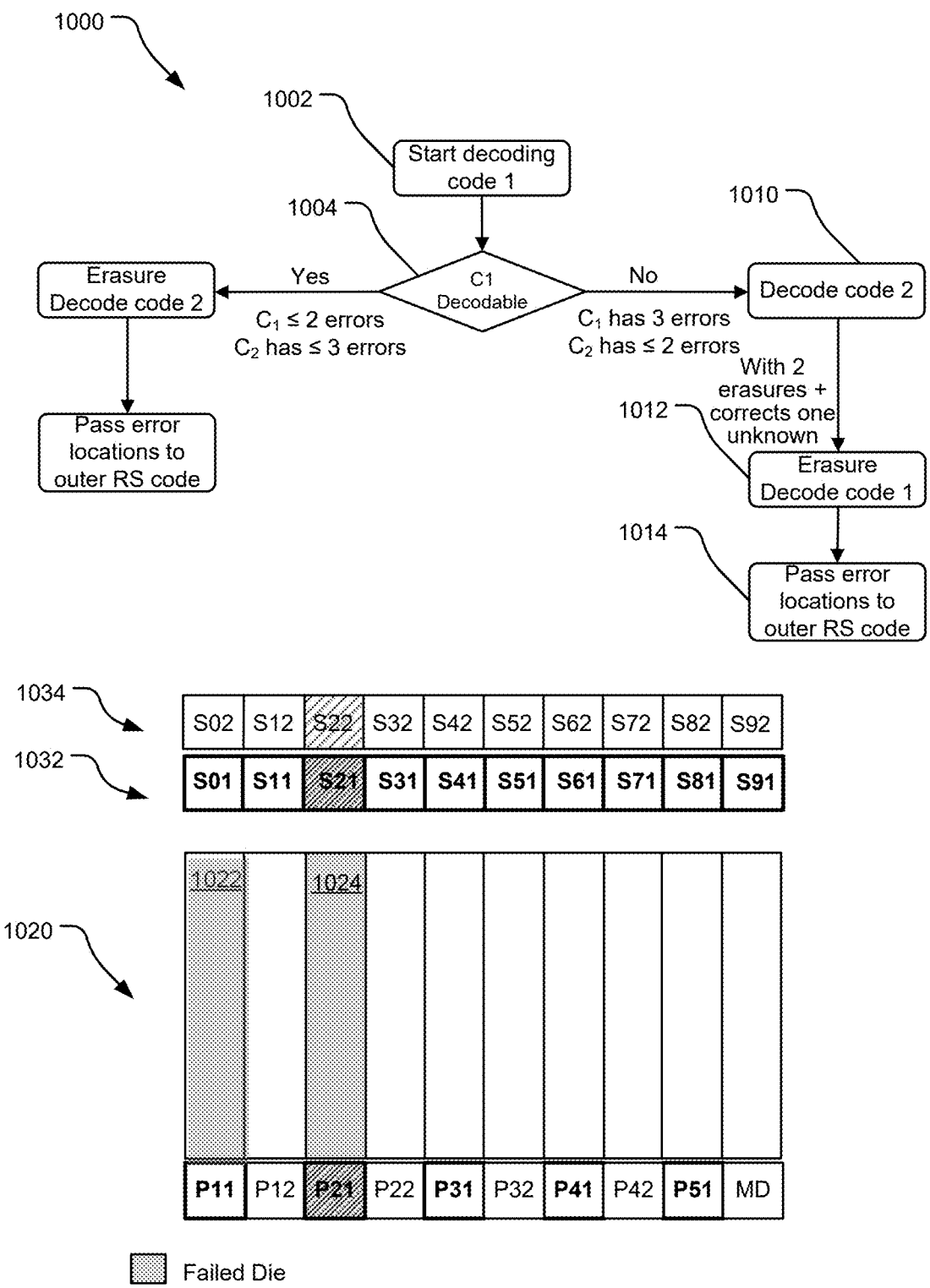
FIG. 10 illustrates an example case wherein a DDR has an error on a data section of a die, an error on the data portion of a die, and also an error on a parity section on the die.

FIG. 10 illustrates a case 1000 wherein a DDR 1020 has an error on a data section of a die 1022, an error on the data portion of a die 1024, and also an error on a parity section P21 on the die 1024. In this case, there are three errors in the code 1 parities, namely, S01, S21, and P21 and there are two errors in code 2 parities, namely S02 and S22.

An operation 1002 first starts decoding code 1 parities (C1). An operation 1004 determines if C1 is decodable. Code 1 is able to correct up to two errors and in this case, there are three code 1 errors, S01, S21, and P21. Therefore, control transfers to operation 1010 to decide code 2 parity. Operation 1010 is able to decode code 2 as it has only two errors and it determines the location of the errors being on dies 1022 and 1024. This information is passed on to operation 1012 which can erasure decode up to five parities if it knows the location. In this case, it knows the error to be in one of S01, S21, P11, and P21. Therefore, it is able to decode code 1 and the location of the errors in die 1022 and die 1024 is passed on to the outer decoder at operation 1014.

Figure 11:
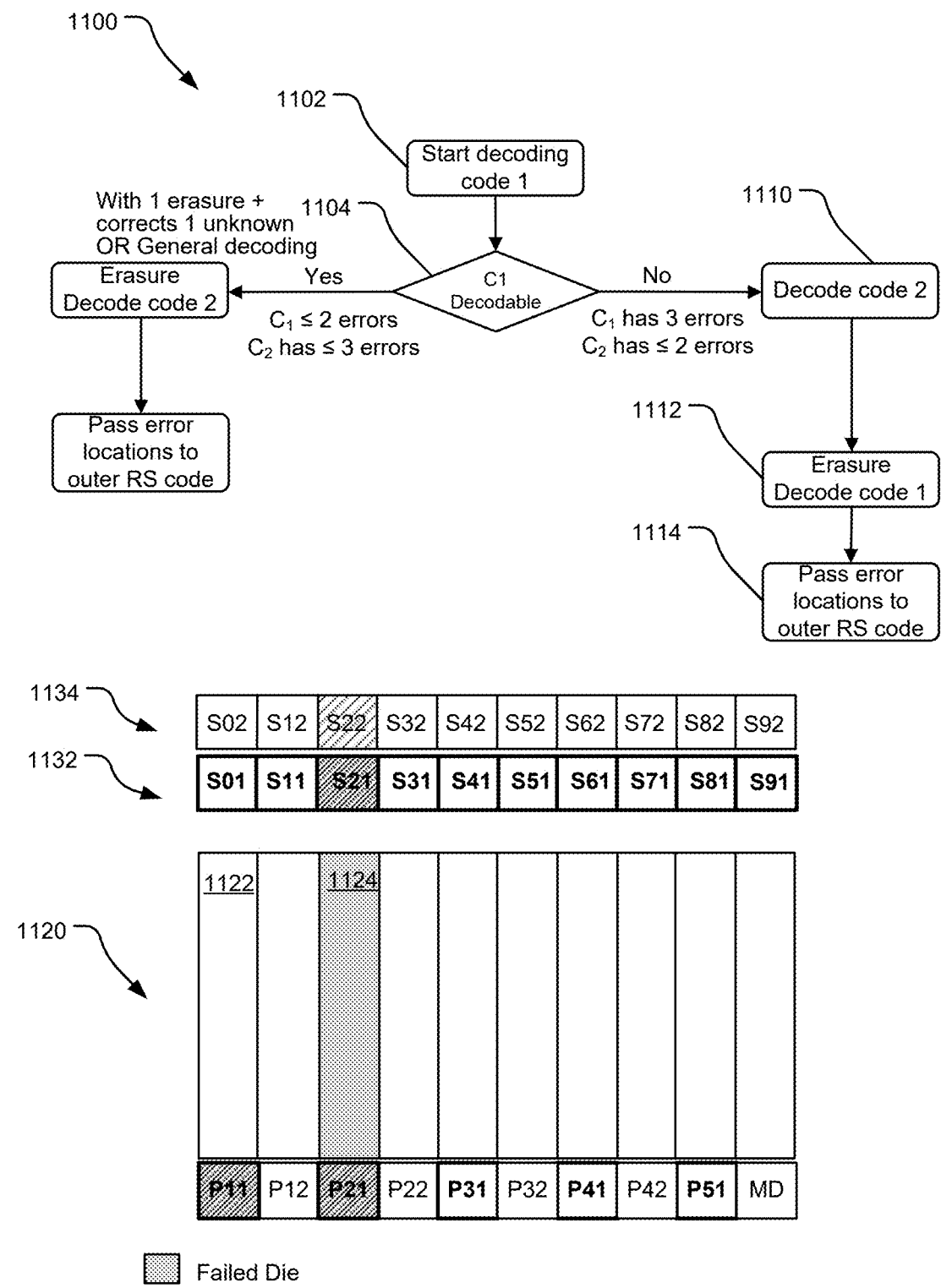
FIG. 11 illustrates an example case wherein a DDR has an error on a parity section of a die, an error on the data portion of a die, and also an error on a parity section on the die.

FIG. 11 illustrates a case 1100 wherein a DDR 1120 has an error on a parity section P11 of a die 1122, an error on the data portion of a die 1124, and also an error on a parity section P21 on the die 1124. In this case, there are three errors in code 1 parities, namely, P11, S21, and P21 and there is only one error in code 2 parities, namely S22.

An operation 1102 first starts decoding code 1 parities (C1). An operation 1104 determines if C1 is decodable. Code 1 is able to correct up to two errors and in this case, there are three code 1 errors, P11, S21, and P21. Therefore, control transfers to operation 1110 to decide code 2 parity. Operation 1110 is able to decode code 2 as it has only one error and it determines the location of the errors being on dies 1122 and 1124. This information is passed on to operation 1112 which can erasure decode up to five parities if it knows the location. Therefore, operation 1112 is able to decode code 1 and the location of the errors in die 1122 and die 1124 is passed on to the outer decoder at operation 1114.

Figure 12:
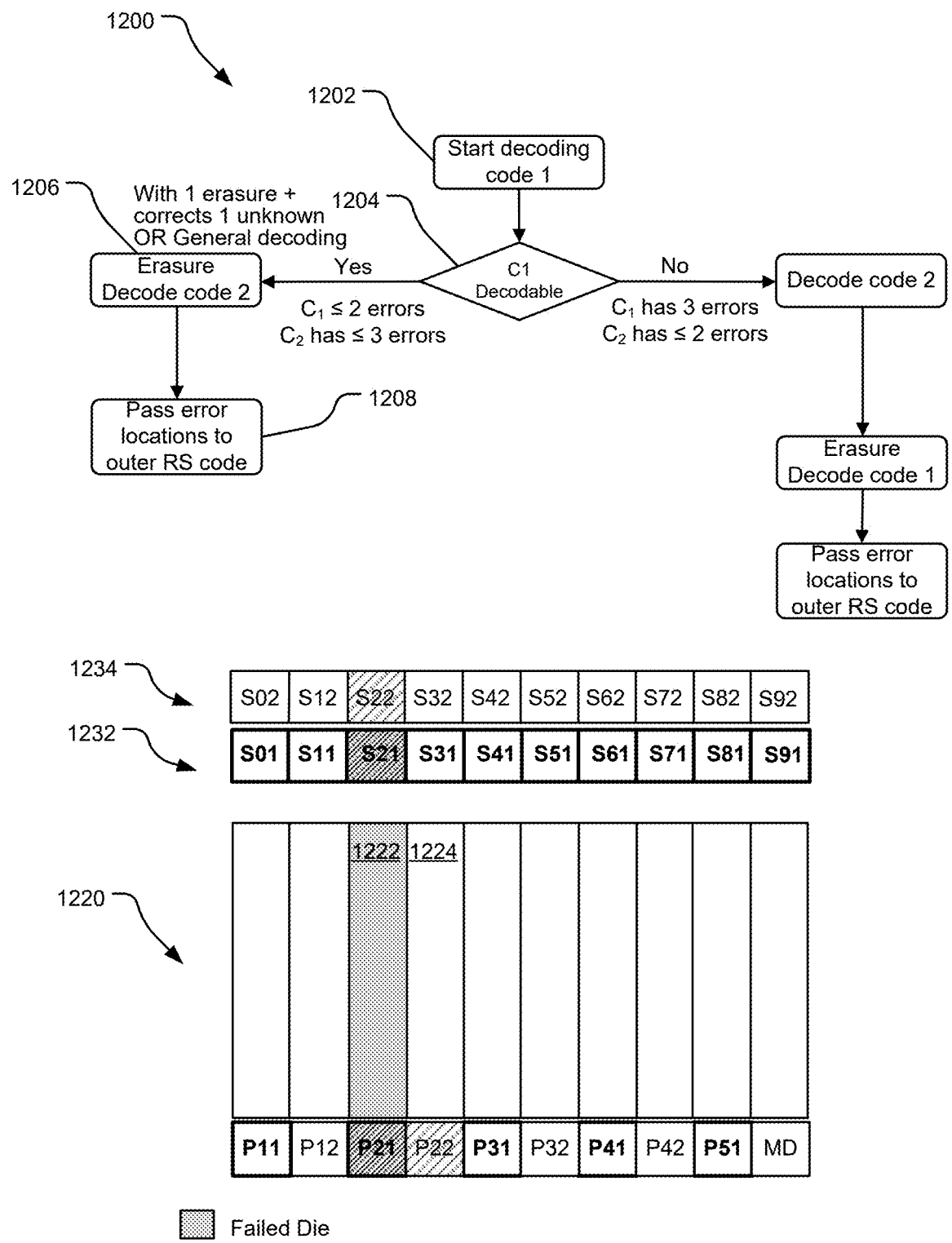
FIG. 12 illustrates an example case wherein a DDR has an error on a parity section of a die, an error on the data portion of a die, and also an error on a parity section on the die.

FIG. 12 illustrates a case 1200 wherein a DDR 1220 has an error on a parity section P22 of a die 1224, an error on the data portion of a die 1222, and also an error on a parity section P21 on the die 1222. In this case, there are two errors in code 1 parities, namely, P21 and S21 and there are two errors in code 2 parities, namely S22 and P22.

An operation 1202 first starts decoding code 1 parities (C1). An operation 1204 determines if C1 is decodable. Code 1 is able to correct up to two errors and in this case, there are two code 1 errors, P21 and S21. Therefore, control transfers to operation 1206 to decide code 2 parity. Operation 1206 is able to decode code 2 as it has only two errors and knowing the information about the location of S22 it determines the location of the errors being on dies 1222 and 1224. Therefore, operation 1206 is able to decode code 2 and the location of the errors in die 1222 and die 1224 is passed on to the outer decoder at operation 1208.

The technology disclosed herein allows correcting errors on dies of the DDR with higher probability when there are more than one errors on single die of the DDR. Specifically, when there are multiple single errors in the cache lines or data portions of the DDR, there is a chance of having dies with multiple single bit (SB) errors. Compared to the technology disclosed herein, previous technology, such as on-die single error correction (SEC) fails if there are more than one errors on the dies. Specifically, with the disclosed technology, as the host decoder has information about error locations, its correction power (through erasure decoding) is twice as the number of symbols as the correction without such information. Furthermore, the increased correction power of outer ECC due to being able to use erasure decoding allows the technology disclosed herein to store additional metadata bits without sacrificing the required data protection.

Figure 13:
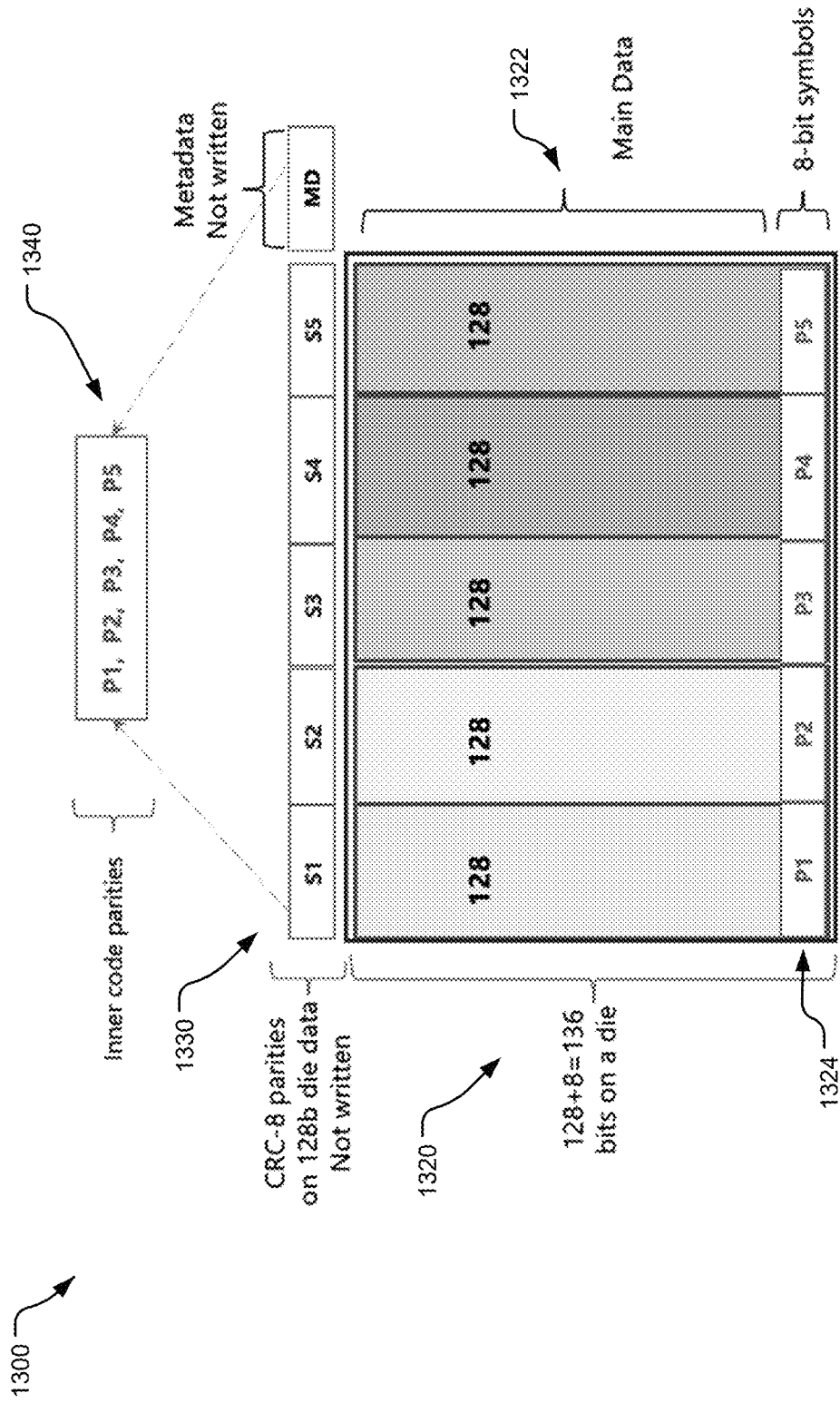
FIG. 13 illustrates an alternative implementation of the disclosed technology with a DDR having a 5×8 configuration in that there are five dies each having 128 bits of data and 8 bits of parity per die.

FIG. 13 illustrates an alternative implementation 1300 of the disclosed technology with a DDR 1320 having a 5×8 configuration in that there are five dies each having 128 bits of data and 8 bits of parity P1-P5, respectively per die. In this implementation, the CRC coder generates transitional symbols 1330, which includes five 8-bit transitional symbols S1-S5. The transitional symbols 1330 and the 8-bit metadata (MB) are used to generate inner code parities 1340, which includes five inner code parities P1-P5 that can be stored at the parity bit locations 1324 in the DDR 1320.

The decoding operations first decodes the inner codes 1340 to determine the location of the errors and informs the host decoder with the location information as to which dies have the errors. The host decoder may use this information to perform erasure decoding more efficiently. This implementation allows correcting a full die failure with error on both the data 1322 and parity bits 1324 of a single die of the DDR 1320.

Figure 14:
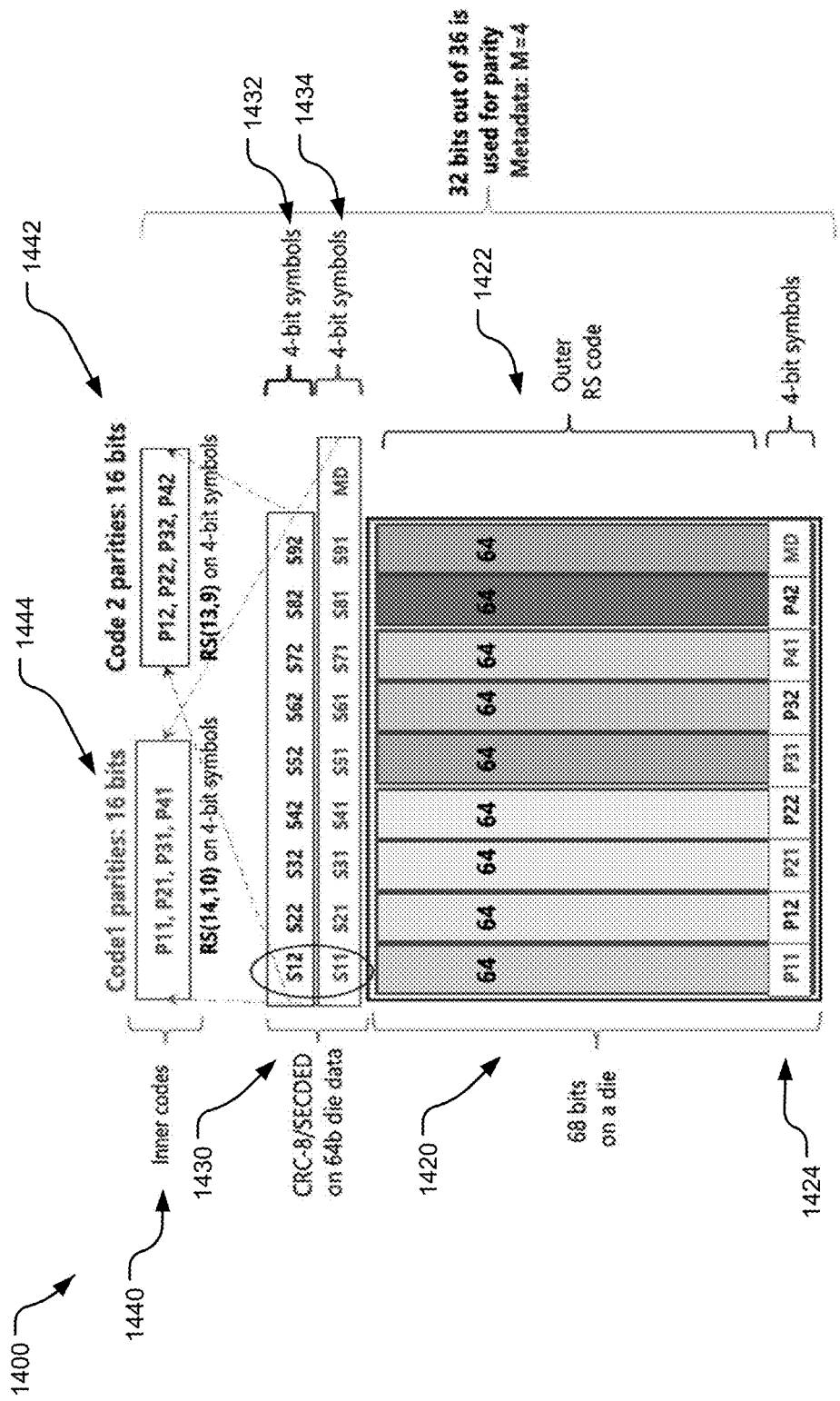
FIG. 14 illustrates an alternative implementation of the disclosed technology with a DDR having a 9×4 configuration in that there are nine dies each having 64 bits of data and 4 bits of parity per die.

FIG. 14 illustrates an alternative implementation 1400 of the disclosed technology with a DDR 1420 having a 9×4 configuration in that there are nine dies each having 64 bits of data and 4 bits of parity per die. In this case 8 of the nine dies are used for data and the ninth die is used for parity information. Given that there is only one die used to for parity information, the host has lesser information for correcting errors.

In this implementation, the CRC coder generates transitional symbols 1430 including a first series of transitional symbols 1432 and a second series of transitional symbols 1434. The transitional symbols 1430 and the 4-bit metadata (MB) are used to generate inner code parities 1440, which includes four (4) code 1 parities 1442 and four (4) code 2 parities 1444. As a result, code 1 parities 1442 and the code 2 parities 1444 has the same decoding power.

Figure 15:
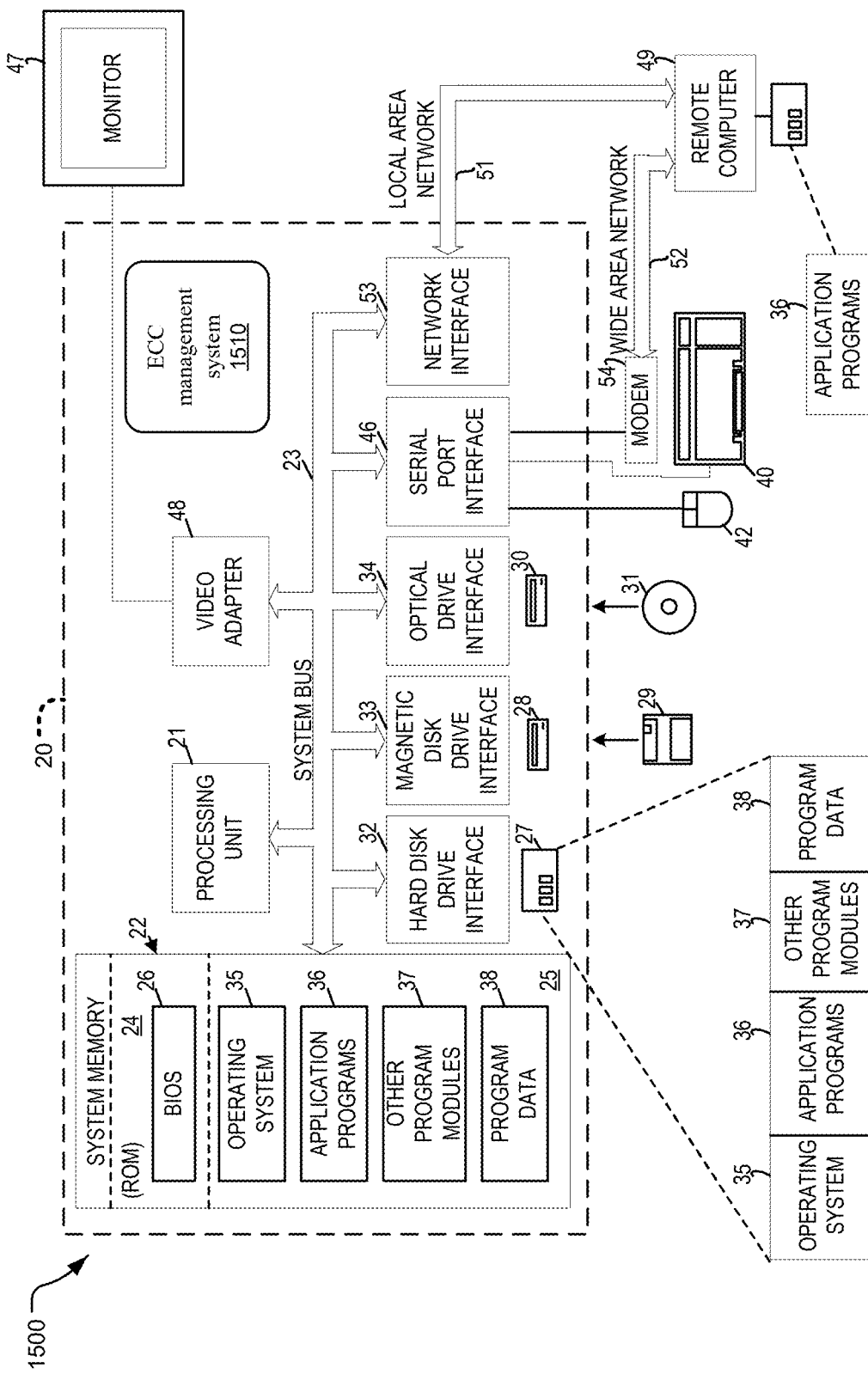
FIG. 15 illustrates an example computing system that may be used to implement the ECC management system disclosed herein.

FIG. 15 illustrates an example system 1500 that may be useful in implementing the ECC management disclosed herein. The example hardware and operating environment of FIG. 15 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 15, for example, the computer 20 includes a processing unit 21, a system memory 22, and a system bus 23 that operatively couples various system components including the system memory 22 to the processing unit 21. There may be only one or there may be more than one processing unit 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

In the example implementation of the computing system 1500, the computer 20 also includes an ECC management system 1510 disclosed herein.

The system bus 23 may be any of several types of bus structures including a memory bus or memory controller, a peripheral bus, a switched fabric, point-to-point connections, and a local bus using any of a variety of bus architectures. The system memory may also be referred to as simply the memory and includes read-only memory (ROM) 24 and random-access memory (RAM). A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

In one implementation, one or more instructions to interpret signal outputs generated by the ECC management system 1510 may be stored in the memory of the computer 20, such as the read-only memory (ROM) 24 and random-access memory (RAM) 25, etc.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device, or other common network node, and typically includes many or all of the elements described above relative to the computer 20. The logical connections depicted in FIG. 12 include a local-area network (LAN) 51 and a wide-area network (WAN) 52. Such networking environments are commonplace in office networks, enterprise-wide computer networks, intranets, and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software, or firmware instructions for the ECC management system 1510 may be stored in system memory 22 and/or storage devices 29 or 31 and processed by the processing unit 21. The ECC management system 1510 and data used by the ECC management system 1510 may be stored in system memory 22 and/or storage devices 29 or 31 as persistent data-stores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared, and other wireless media.

Some implementations of the ECC management system may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain function. The instructions may be implemented using any suitable high-level, low-level, object-oriented, visual, compiled and/or interpreted programming language.

The ECC management sensing system disclosed herein may include a variety of tangible computer-readable storage media and intangible computer-readable communication signals. Tangible computer-readable storage can be embodied by any available media that can be accessed by the ECC management system disclosed herein and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the ECC management system disclosed herein. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared, and other wireless media.

The described technology provides a multi-level error correction method, including encoding data received from a double data rate (DDR) memory by performing primary coding to generate transitional symbols, wherein the primary coding comprising at least one of cyclical redundancy check (CRC) encoding and single error correction double error detection (SECDED) encoding, performing a secondary coding on the transitional symbols to generate inner codes, the inner codes comprising code 1 parities generated from the transitional symbols and code 2 parities generated from the transitional symbols and metadata stored on the DDR memory, wherein the secondary coding comprising Reed Solomon (RS) encoding, and saving the inner codes on parity bit storage locations on a die of the DDR memory.

Alternatively, a computing system disclosed herein includes a memory, one or more processor units, and an error correction code (ECC) management system stored in the memory and executable by the one or more processor units, the ECC management system encoding computer-executable instructions on the memory for executing on the one or more processor units a computer process for multi-level error correction, the computer process including encoding data received from a double data rate (DDR) memory by performing primary coding to generate transitional symbols, wherein the primary coding comprising at least one of cyclical redundancy check (CRC) encoding and single error correction double error detection (SECDED) encoding, performing a secondary coding on the transitional symbols to generate inner codes, the inner codes comprising code 1 parities generated from the transitional symbols and code 2 parities generated from the transitional symbols and metadata stored on the DDR memory, wherein the secondary coding comprising Reed Solomon (RS) encoding, and saving the inner codes on parity bit storage locations on a die of the DDR memory.

In another implementation, a physical article of manufacture including one or more tangible computer-readable storage device, encoding computer-executable instructions for executing on a computer system a computer process for multi-level error correction, the computer process including encoding data received from a double data rate (DDR) memory by performing primary coding to generate transitional symbols, wherein the primary coding comprising at least one of cyclical redundancy check (CRC) encoding and single error correction double error detection (SECDED) encoding, performing a secondary coding on the transitional symbols to generate inner codes, the inner codes comprising code 1 parities generated from the transitional symbols and code 2 parities generated from the transitional symbols and metadata stored on the DDR memory, wherein the secondary coding comprising Reed Solomon (RS) encoding, and saving the inner codes on parity bit storage locations on a die of the DDR memory.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

What is claimed is:

1. A multi-level error correction method, comprising:
   encoding data received from a double data rate (DDR) memory by performing primary coding to generate transitional symbols, wherein the primary coding comprising at least one of cyclical redundancy check (CRC) encoding and single error correction double error detection (SECDED) encoding;
   performing a secondary coding on the transitional symbols to generate inner codes, the inner codes comprising code 1 parities generated from the transitional symbols and code 2 parities generated from the transitional symbols and metadata stored on the DDR memory, wherein the secondary coding comprising Reed Solomon (RS) encoding; and
   saving the inner codes on parity bit storage locations on a die of the DDR memory.

2. The method of claim 1, wherein the transitional symbols comprising a first series of transitional symbols and a second series of transitional symbols and wherein performing the secondary coding further comprising:
   performing the Reed Solomon (RS) encoding on first series of transitional symbols parities to generate the code 1 parities; and
   performing the RS encoding on the second series of transitional symbols and the metadata to generate the code 2 parities.

3. The method of claim 1, wherein performing primary coding to generate transitional symbols further comprising performing cyclical redundancy check (CRC) on the data.

4. The method of claim 1, wherein performing primary coding to generate transitional symbols further comprising performing single error correction double error detection (SECDED) on the data.

5. The method of claim 1 wherein for the memory including ten (10) dies, the code 1 parities include twenty (20) bits and wherein the code 2 parities include sixteen (16) bits.

6. The method of claim 1, further comprising using erasure decoding using the code 1 parities and the code 2 parities to recover the data from the memory.

7. The method of claim 1, wherein the memory including nice nine (9) dies, the code 1 parities include sixteen (16) bits and wherein the code 2 parities include sixteen (16) bits.

8. The method of claim 1, wherein the memory including five (5) dies, the code 1 parities include twenty (20) bits.

9. The method of claim 1, further comprising decoding the code 1 parities and the code 2 parities to generate information about location of single bit error on the memory.

10. The method of claim 1, wherein the transitional symbols are not saved on the DDR.

11. The method of claim 1, wherein saving the inner codes on parity bit storage locations on a die of the DDR memory further comprising allowing a host to use parity bit storage space at the host for other data storage.

12. The method of claim 6 further comprising using the code 1 parities before the code 2 parities to recover data from the memory.

13. A computing system, comprising:
memory;
one or more processor units; and
an error correction code (ECC) management system stored in the memory and executable by the one or more processor units, the ECC management system encoding computer-executable instructions on the memory for executing on the one or more processor units a computer process for multi-level error correction, the computer process comprising:
encoding data received from a double data rate (DDR) memory by performing primary coding to generate transitional symbols;
performing a secondary coding on the transitional symbols to generate inner codes, the inner codes comprising code 1 parities generated from the first series of transitional symbols and code 2 parities generated from the second series of transitional symbols and metadata stored on the DDR memory, wherein the secondary coding comprising Reed Solomon (RS) encoding; and
saving the inner codes on parity bit storage locations on a die of the double data rate (DDR) memory.

14. The computing system of claim 13, wherein the transitional symbols comprising a first series of transitional symbols and a second series of transitional symbols and wherein performing the secondary coding further comprising:
performing a Reed Solomon (RS) encoding on first series of transitional symbols parities to generate the code 1 parities; and
performing a RS encoding on the second series of transitional symbols and the metadata to generate the code 2 parities.

15. The computing system of claim 13, wherein performing primary coding to generate transitional symbols further comprising performing cyclical redundancy check (CRC) on the data.

16. The computing system of claim 13, wherein performing primary coding to generate transitional symbols further comprising performing single error correction double error detection (SECDED) on the data.

17. The computing system of claim 13, wherein the memory including ten (10) dies, the code 1 parities include twenty (20) bits and wherein the code 2 parities include 16 bits.

18. A physical article of manufacture including one or more tangible computer-readable storage device, encoding computer-executable instructions for executing on a computer system a computer process for multi-level error correction, the computer process comprising:
encoding data received from a double data rate (DDR) memory by performing primary coding to generate transitional symbols, wherein the primary coding comprising at least one of cyclical redundancy check (CRC) encoding and single error correction double error detection (SECDED) encoding;
performing a secondary coding on the transitional symbols to generate inner codes, the inner codes comprising code 1 parities generated from the first series of transitional symbols and code 2 parities generated from the second series of transitional symbols and metadata stored on the DDR memory, wherein the secondary coding comprising Reed Solomon (RS) encoding; and
saving the inner codes on parity bit storage locations on a die of the DDR memory.

19. The physical article of manufacture of claim 18, wherein the transitional symbols comprising a first series of transitional symbols and a second series of transitional symbols and wherein performing the secondary coding further comprising:
performing a Reed Solomon (RS) encoding on first series of transitional symbols parities to generate the code 1 parities; and
performing a RS encoding on the second series of transitional symbols and the metadata to generate the code 2 parities.

20. The physical article of manufacture of claim 18, wherein performing primary coding to generate transitional symbols further comprising performing cyclical redundancy check (CRC) on the data.

* * * * *